United States Patent
Miller (10) Patent No.: US 10,236,711 B1
(45) Date of Patent: Mar. 19, 2019

(54) SOLAR-CHARGING STORAGE CONTAINER APPARATUS

(71) Applicant: Adam Brett Miller, Jupiter, FL (US)

(72) Inventor: Adam Brett Miller, Jupiter, FL (US)

( * ) Notice: Subject to any disclaimer, the term of this patent is extended or adjusted under 35 U.S.C. 154(b) by 0 days.

(21) Appl. No.: 15/082,126

(22) Filed: Mar. 28, 2016

(51) Int. Cl.
| | |
|---|---|
| *H02J 7/35* | (2006.01) |
| *B65D 51/24* | (2006.01) |
| *B65D 43/16* | (2006.01) |
| *B65D 43/22* | (2006.01) |
| *B65D 25/02* | (2006.01) |
| *H02J 7/00* | (2006.01) |

(52) U.S. Cl.
CPC ............... *H02J 7/35* (2013.01); *B65D 25/02* (2013.01); *B65D 43/16* (2013.01); *B65D 43/22* (2013.01); *B65D 51/24* (2013.01); *H02J 7/0042* (2013.01); *Y02E 10/50* (2013.01); *Y02E 10/52* (2013.01); *Y02E 70/30* (2013.01); *Y10T 307/50* (2015.04)

(58) Field of Classification Search
CPC ......... Y02E 10/50; Y02E 10/52; Y02E 70/30; H02J 3/383; H02J 7/35; H02J 7/0042; Y10T 307/50; Y02B 10/20; B65D 25/02; B65D 43/16; B65D 51/24; B65D 43/22
See application file for complete search history.

(56) References Cited

U.S. PATENT DOCUMENTS

| | | | |
|---|---|---|---|
| 4,293,808 A * | 10/1981 | Varadi ..................... | H02J 7/355 |
| | | | 136/251 |
| 4,896,452 A | 1/1990 | Smith et al. | |
| 4,981,019 A | 1/1991 | Hicks et al. | |
| 5,330,104 A * | 7/1994 | Marcus ..................... | F24F 6/14 |
| | | | 239/266 |
| 5,379,596 A | 1/1995 | Grayson | |
| 5,905,356 A | 5/1999 | Wells | |
| 6,870,089 B1 | 3/2005 | Gray | |
| 7,464,814 B2 | 12/2008 | Carnevali | |
| 7,492,120 B2 * | 2/2009 | Benn ......................... | F24J 2/36 |
| | | | 318/556 |
| 7,619,884 B1 | 11/2009 | Gray | |

(Continued)

FOREIGN PATENT DOCUMENTS

| | | |
|---|---|---|
| CN | 201893580 U | 7/2011 |
| CN | 203770053 U * | 8/2014 |

(Continued)

*Primary Examiner* — Helen Rossoshek
(74) *Attorney, Agent, or Firm* — Glenn E. Gold, P.A.; Glenn E. Gold (57) ABSTRACT

A solar-charging storage container apparatus includes a container body having a top rim, a container lid having a bottom rim and being adapted to overlie the container body such that the container body and the container lid form a storage compartment, an arrangement of mechanisms positioned proximate the top rim of said container body and the bottom rim of the container lid and being adapted to removably fit the top and bottom rims together so as to form a water resistant seal therebetween, and a solar-charging module incorporated by the container lid and having a solar array on an outer portion of the module being exposed exteriorly of the container lid to receive solar rays and at least one electrical connector on an inner portion of the module being exposed interiorly of the container lid for electrical connection to an electronic device stored in the storage compartment.

15 Claims, 11 Drawing Sheets

(56) References Cited

U.S. PATENT DOCUMENTS

| | | | |
|---|---|---|---|
| 8,410,748 B2 | 4/2013 | Wilson | |
| 8,432,124 B2 | 4/2013 | Foster | |
| 8,866,570 B2* | 10/2014 | Gilmore | H01H 36/0006 335/151 |
| 8,917,506 B2 | 12/2014 | Diebel et al. | |
| D730,820 S | 6/2015 | Werner | |
| 9,480,180 B1* | 10/2016 | Thompson | H02B 1/52 |
| 2002/0158602 A1 | 10/2002 | McNair, Jr. | |
| 2003/0157893 A1* | 8/2003 | Peeples | F25D 23/12 455/66.1 |
| 2005/0161079 A1 | 7/2005 | Gray | |
| 2005/0243522 A1 | 11/2005 | Nilsen et al. | |
| 2006/0012331 A1 | 1/2006 | Gillette, II | |
| 2006/0273757 A1 | 12/2006 | Naguib | |
| 2008/0125188 A1 | 5/2008 | Huang | |
| 2008/0152482 A1* | 6/2008 | Patel | F04B 17/006 415/121.3 |
| 2008/0210728 A1 | 9/2008 | Bihn | |
| 2008/0275595 A1* | 11/2008 | Bailey | A01G 25/16 700/284 |
| 2009/0025411 A1 | 1/2009 | Anderson | |
| 2009/0072782 A1* | 3/2009 | Randall | G06F 1/1616 320/107 |
| 2010/0317413 A1* | 12/2010 | Tan | H02J 7/0044 455/573 |
| 2011/0062911 A1* | 3/2011 | Lloyd | H02J 7/0044 320/101 |
| 2012/0042996 A1 | 2/2012 | Glynn | |
| 2012/0235631 A1* | 9/2012 | Nakashima | H01M 14/005 320/107 |
| 2013/0134921 A1* | 5/2013 | Shen | H02J 7/0052 320/101 |
| 2013/0193905 A1* | 8/2013 | Wilson | H01M 10/465 320/101 |
| 2014/0232342 A1* | 8/2014 | Turner | H02J 7/0042 320/114 |
| 2014/0266001 A1* | 9/2014 | Wilde | H02J 7/355 320/101 |
| 2016/0211686 A1* | 7/2016 | Kovaly | H02J 7/0042 |
| 2016/0294022 A1* | 10/2016 | Thramann | B60L 11/1822 |
| 2016/0301354 A1* | 10/2016 | Draffin, II | H02S 10/40 |
| 2016/0363275 A1* | 12/2016 | Davis | F21V 21/22 |
| 2017/0012925 A1* | 1/2017 | Tekin | H04L 51/32 |
| 2017/0027342 A1* | 2/2017 | Mishra | A47G 9/062 |

FOREIGN PATENT DOCUMENTS

| | | | |
|---|---|---|---|
| CN | 104701917 A | * | 6/2015 |
| CN | 206029819 U | * | 3/2017 |
| WO | 2010148656 A1 | | 12/2010 |

* cited by examiner

SOLAR-CHARGING STORAGE CONTAINER APPARATUS

FIELD OF THE INVENTION

The present invention relates to storage and protection of electronic devices, and, more particularly, is concerned with a solar-charging storage container apparatus, such as for rechargeable mobile electronic devices.

BACKGROUND OF THE INVENTION

Rechargeable electronic devices such as cell phones, personal computing devices, digital cameras and the like are mobile devices that many people who own them believe need to be kept handy because their use is frequently required whether at home or away. These devices typically are brought along while people are traveling away from home, even on outdoor trips and around water.

Protection and safekeeping of such rechargeable mobile electronic devices while they are being carried away from home on outdoor trips and around water is a major concern. Also, another major concern is the need to keep such rechargeable mobile electronic devices fully charged and ready for use.

Accordingly, there remains a need in the art for an innovation that will overcome past shortcomings in addressing these concerns and any problems that remain unsolved.

SUMMARY OF THE INVENTION

The present invention overcomes past shortcomings and any problems that remain unsolved by providing a solar-charging storage container apparatus, such as for rechargeable mobile electronic devices.

In one aspect of the present invention, a solar-charging storage container apparatus includes:
- a container body having a top rim;
- a container lid having a bottom rim, the container lid at the bottom rim thereof being adapted to overlie the container body at the top rim thereof such that the container body and the container lid form a storage compartment;
- an arrangement of mechanisms positioned proximate the top rim of the container body and the bottom rim of the container lid and being adapted to removably fit the top and bottom rims together so as to form a water resistant seal therebetween; and
- a solar-charging module incorporated by the container lid and having a solar array on an outer portion of the module being exposed exteriorly of the container lid to receive solar rays and at least one electrical connector on an inner portion of the module being exposed interiorly of the container lid to form an electrical connection to an electronic device stored in the storage compartment.

In another aspect of the present invention, a solar-charging storage container apparatus includes:
- a container body having a top rim;
- a container lid having a bottom rim, the container lid at the bottom rim thereof being adapted to overlie the container body at the top rim thereof such that the container body and the container lid form a storage compartment;
- an arrangement of mechanisms positioned proximate the top rim of the container body and the bottom rim of the container lid and being adapted to removably fit the top and bottom rims together so as to form a water resistant seal therebetween, the arrangement of mechanisms including
  - at least one hinge interconnecting the container lid and the container body proximate respective adjacent first portions of the bottom rim of the container lid and the top rim of the container body so as to permit the container lid to pivot relative to the container body and thereby open and close the storage compartment,
  - at least one latch positioned proximate respective adjacent second portions of the bottom rim of the container lid and the top rim of the container body and being adapted for detachably securing the container lid to the container body, and
  - a sealing gasket applied about at least one of the top rim of the container body and the bottom rim of the container lid so as to form the water resistant seal therebetween when fitted together; and
- a solar-charging module incorporated by the container lid and having a solar array on an outer portion of the module being exposed exteriorly of the container lid to receive solar rays and at least one electrical connector on an inner portion of the module being exposed interiorly of the container lid to form an electrical connection to an electronic device stored in the storage compartment.

In still another aspect of the present invention, a solar-charging storage container apparatus includes:
- a container body having a top rim;
- a container lid having a bottom rim, the container lid at the bottom rim thereof being adapted to overlie the container body at the top rim thereof such that the container body and the container lid form a storage compartment;
- an arrangement of mechanisms positioned proximate the top rim of the container body and the bottom rim of the container lid and being adapted to removably fit the top and bottom rims together so as to form a water resistant seal therebetween, the arrangement of mechanisms including
  - at least one hinge interconnecting the container lid and the container body proximate respective adjacent first portions of the bottom rim of the container lid and the top rim of the container body so as to permit the container lid to pivot relative to the container body and thereby open and close the storage compartment,
  - at least one latch positioned proximate respective adjacent second portions of the bottom rim of the container lid and the top rim of the container body and being adapted for detachably securing the container lid to the container body, and
  - a sealing gasket applied about at least one of the top rim of the container body and the bottom rim of the container lid so as to form the water resistant seal therebetween when fitted together;
- a solar-charging module incorporated by the container lid and having a solar array on an outer portion of the module being exposed exteriorly of the container lid to receive solar rays and at least one electrical connector on an inner portion of the module being exposed interiorly of the container lid to form an electrical connection to an electronic device stored in the storage compartment;
- at least a pair of anchors attached to a bottom of the container body; and at least a pair of straps each having a pair of opposite ends, each strap at one of the opposite ends being detachably attachable to one of the anchors and at the other of the opposite ends being detachably attachable to one another for enabling the straps to securely fit about a portion of an external structure for mounting the apparatus thereto.

In yet another aspect of the present invention, the container body defines a main portion of the storage compartment, and the container lid defines an auxiliary portion of the storage compartment such that the inner portion of the solar-charging module protrudes into the auxiliary portion of the storage compartment. Also, a false bottom disposed in the main portion of the storage compartment so as to provide a base portion of the storage compartment for housing personal items under the false bottom. Further, at least one shackle is mounted to the container body and protrudes either or both interiorly thereof to secure thereto an electronic device stored in the storage compartment and exteriorly thereof to enable securing the apparatus to an exterior structure.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

Figure 1:
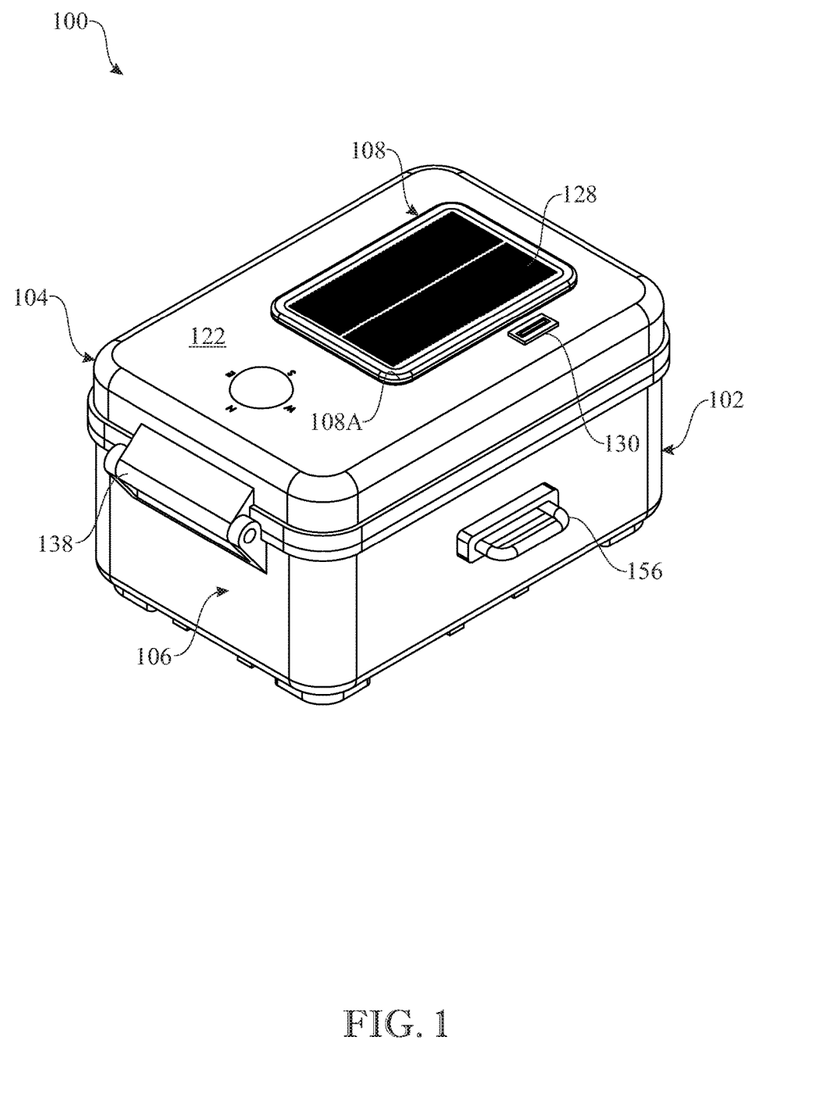
FIG. 1 presents a top rear isometric view of an exemplary embodiment of a solar-charging storage container apparatus in accordance with aspects of the present invention.
Figure 2:
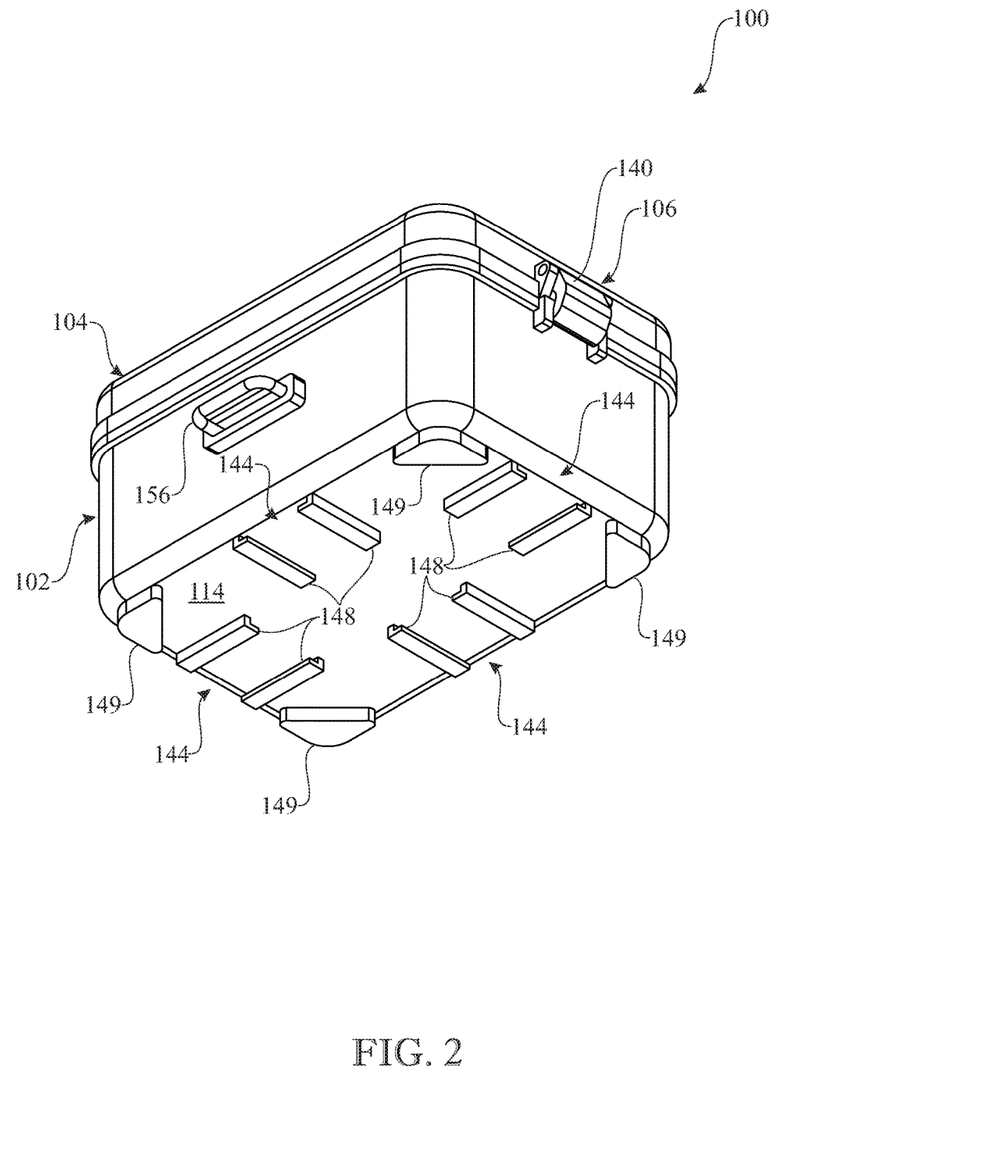
FIG. 2 presents a bottom front isometric view of the apparatus originally introduced in FIG. 1.
Figure 3:
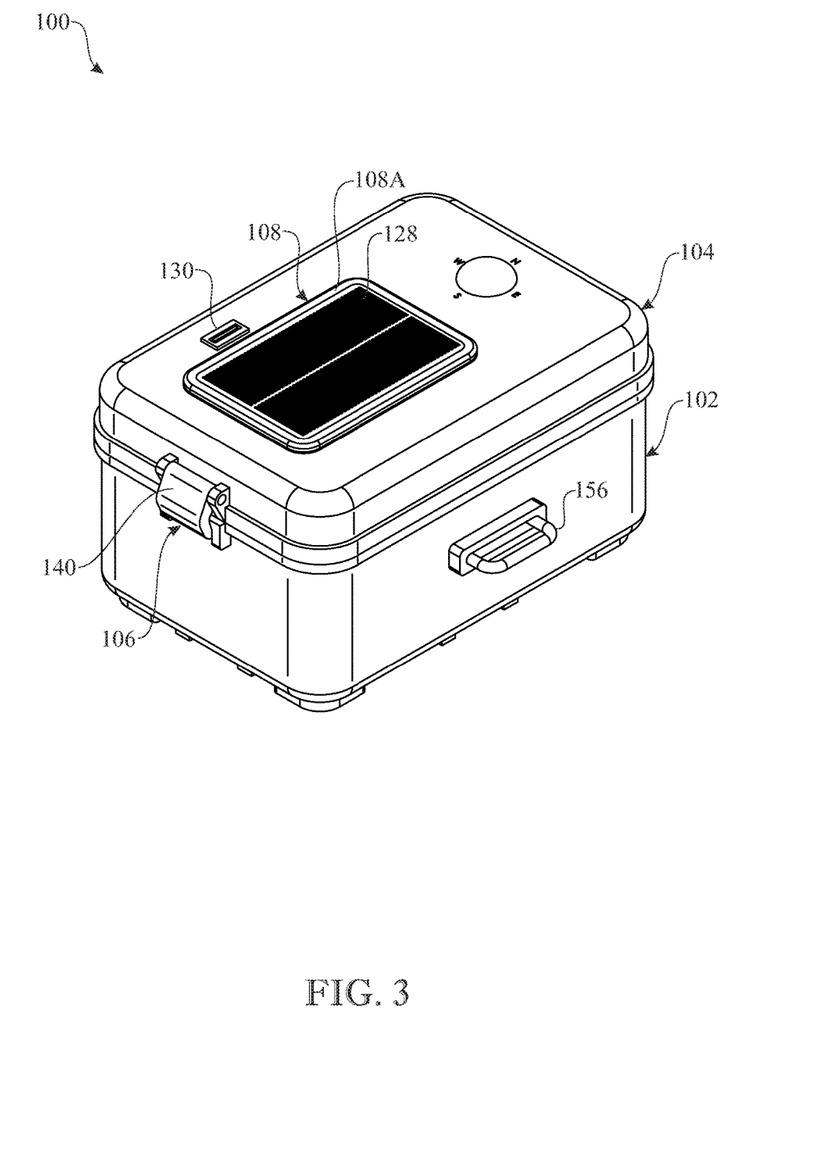
FIG. 3 presents a top front isometric view of the apparatus originally introduced in FIG. 1, illustrating a container lid of the apparatus in a closed position relative to a container body thereof.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIGS. 1-7, there illustrated an exemplary embodiment of a solar-charging storage container apparatus, generally designated 100, in accordance with aspects of the present invention, being adapted, for example, to protect and keep safe and charged rechargeable mobile electronic devices while they are being carried away from home and especially on outdoor trips and around water. The apparatus 100 includes a container body 102, a container lid 104, and an arrangement of mechanisms 106 that form a water resistant seal between the container body 102 and the container lid 104. The apparatus 100 also includes a solar-charging module 108 incorporated by the container lid 104.

More particularly, by way of example, but not limitation, the container body 102 has a rectangular shape defined by a pair of opposite side walls 110, a pair of opposite end walls 112 and a bottom wall 114, all interconnected such as by being molded together to form an one-piece unitary structure made of a lightweight durable plastic and defining a top rim 116. Also, by way of example, but not limitation, the container lid 104 has a similar rectangular shape defined by a pair of opposite side walls 118, a pair of opposite end walls 120 and a top wall 122, all interconnected such as by being molded together to form an one-piece unitary structure also made of a lightweight durable plastic and defining a bottom rim 124. The container lid 104 is thusly adapted to overlie the container body 102 such that the container body 102 and the container lid 104 fit together at the respective top and bottom rims 116, 124 so as to form a storage compartment 126 by them together.

The solar-charging module 108 incorporated by the container lid 104 includes a solar array 128 on an outer portion 108A of the module 108 and a plurality of electrical connectors 130, 132 on an inner portion 108B of the module 108. The solar array 128 on the outer portion 108A of the module 108 is exposed exteriorly of the container lid 104 in order to receive solar rays that energize the module 108 in a well-known manner. The electrical connectors 130, 132 on the inner portion 108B of the module 108 are exposed interiorly of the container lid 104 so as to enable them to form electrical connections with an electronic device (not shown) being stored in the storage compartment 126. The one electrical connector 130 is also exposed exteriorly of the container lid 104. The solar-charging module 108 may be implemented by using any appropriate commercially-available model, such as, by way of example but not limitation, one being commercially identified as the ALLPOWERS™ solar mobile charger.

Figure 4:
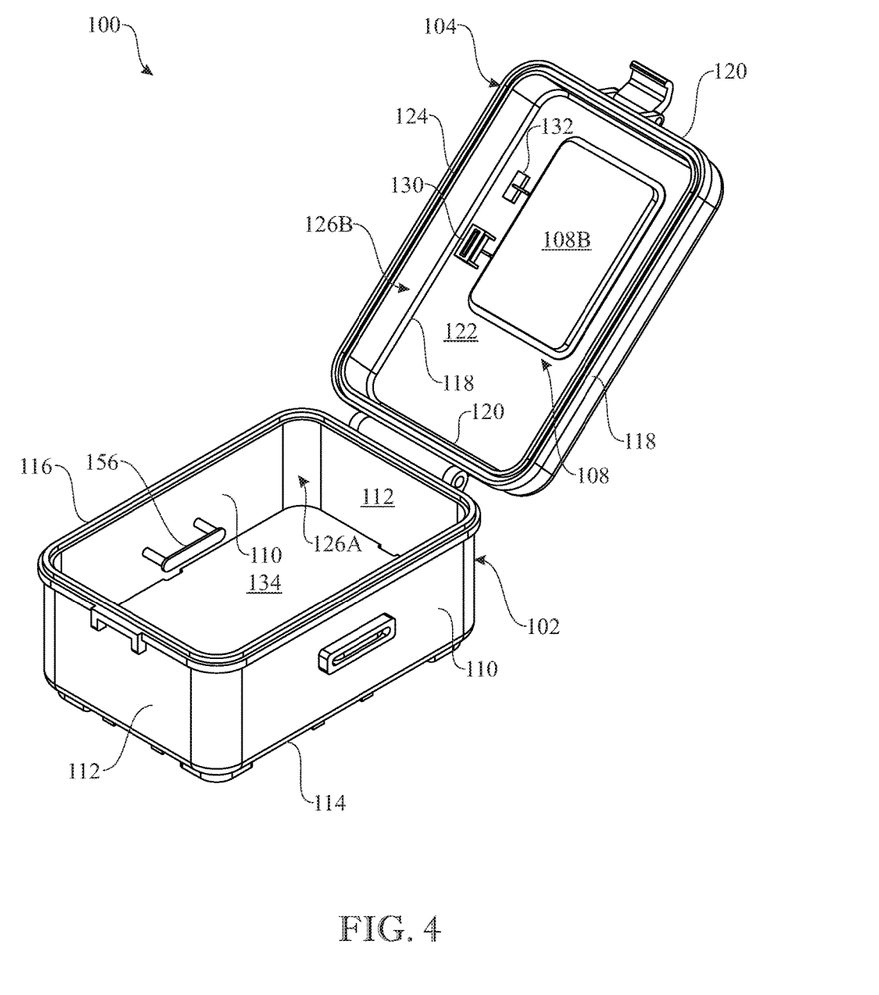
FIG. 4 presents a top front isometric view of the apparatus similar to that of FIG. 4, now illustrating the container lid of the apparatus in an opened position relative to the container body.
Figure 5:
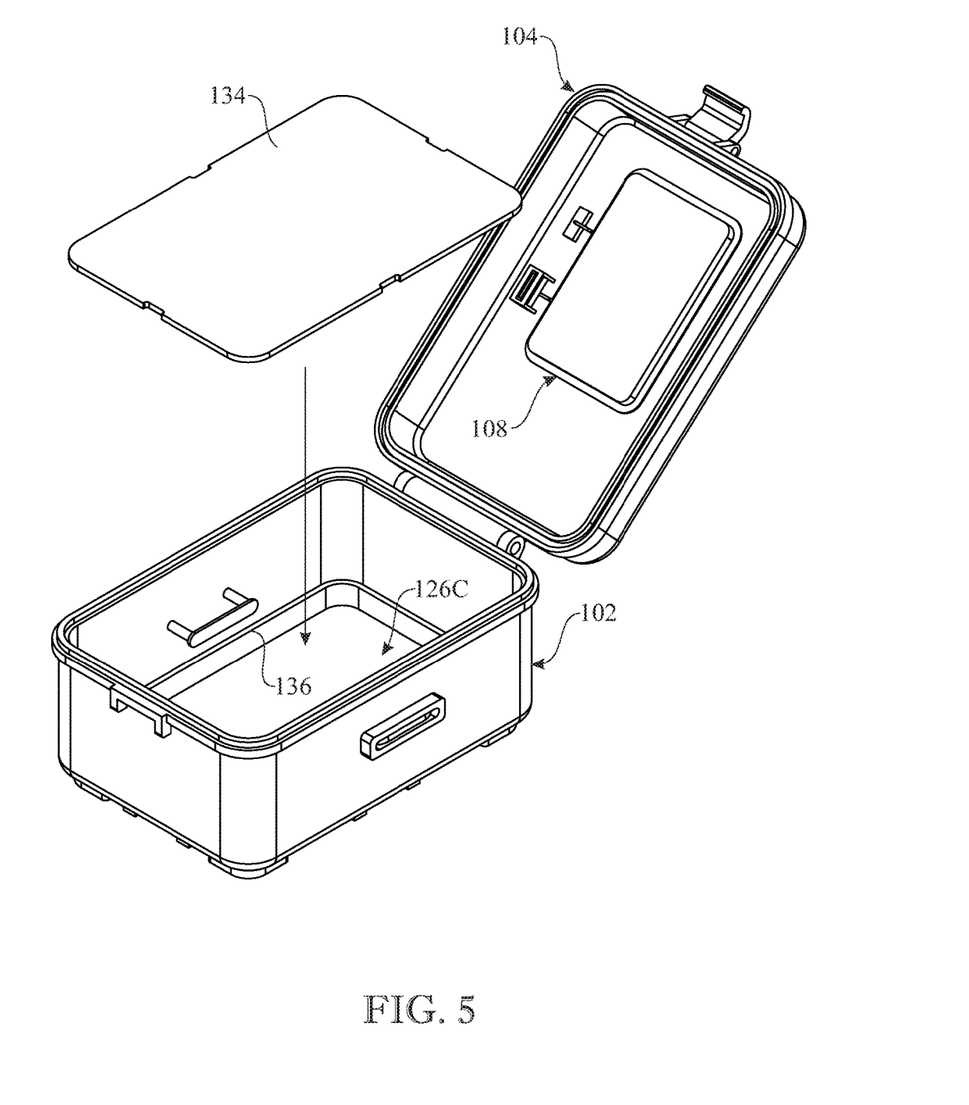
FIG. 5 presents another isometric view of the apparatus similar to that of FIG. 4, now illustrating a false bottom of the apparatus being separated from the container body thereof.
Figure 6:
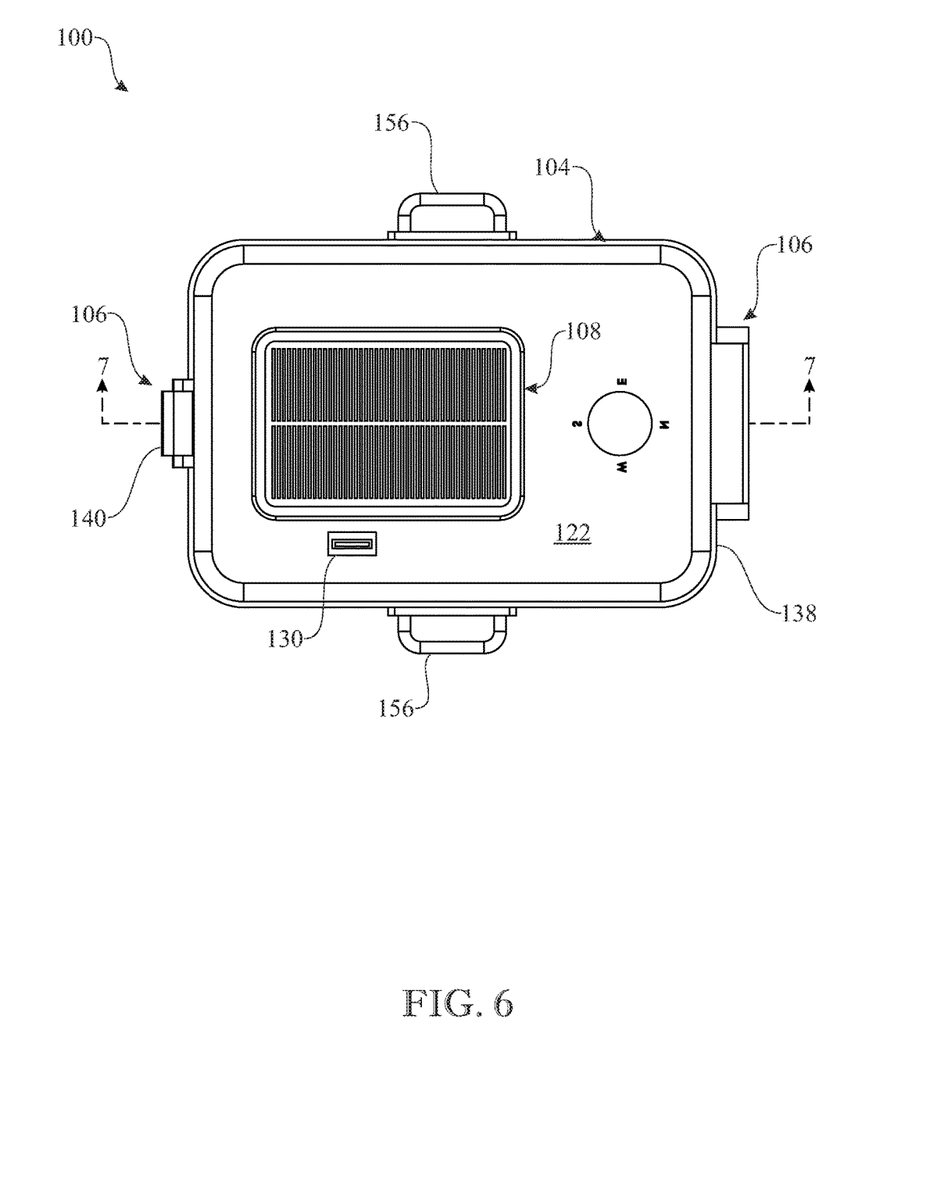
FIG. 6 presents a top plan view of the apparatus as seen in FIG. 3.
Figure 7:
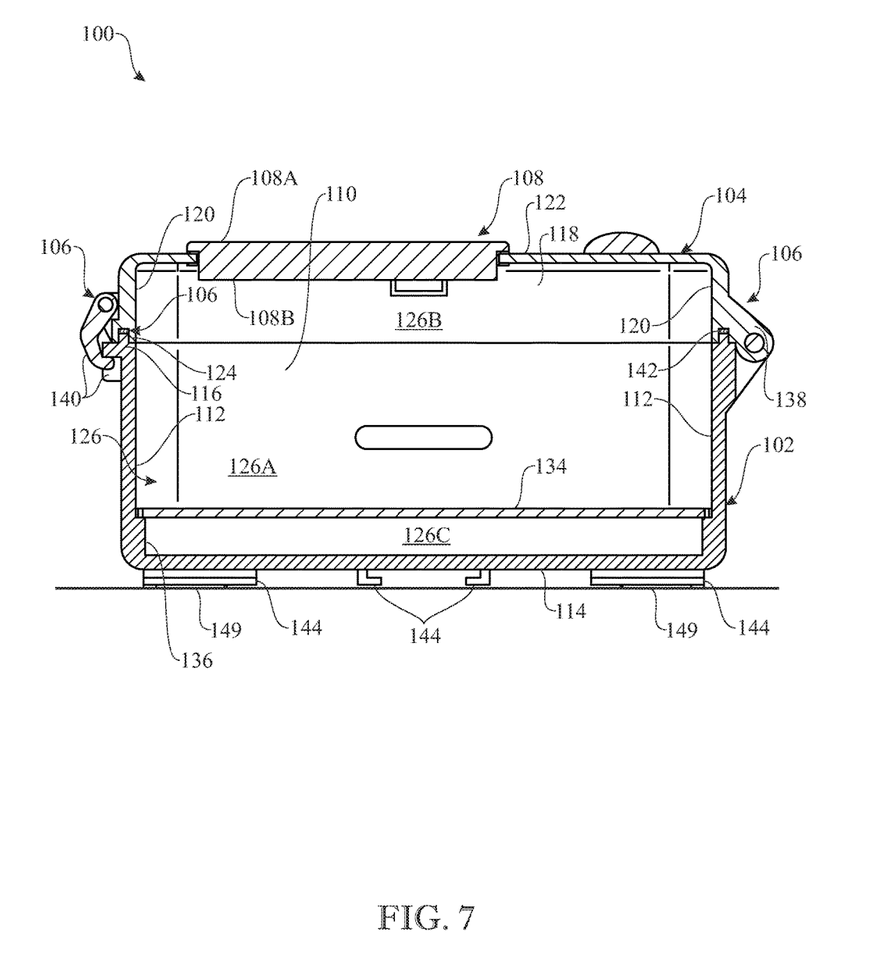
FIG. 7 presents an enlarged longitudinal sectional view of the apparatus as seen along line 7-7 of FIG. 6.
Figure 8:
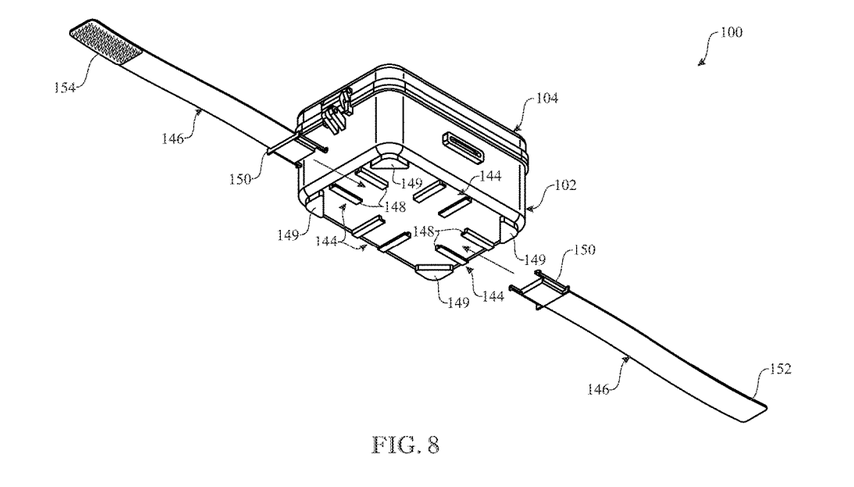
FIG. 8 presents a bottom front isometric view of the apparatus after being turned one-hundred eighty degrees from its position in FIG. 2, now illustrating a pair of straps attachable to a bottom of the container body from opposite ends thereof.
Figure 9:
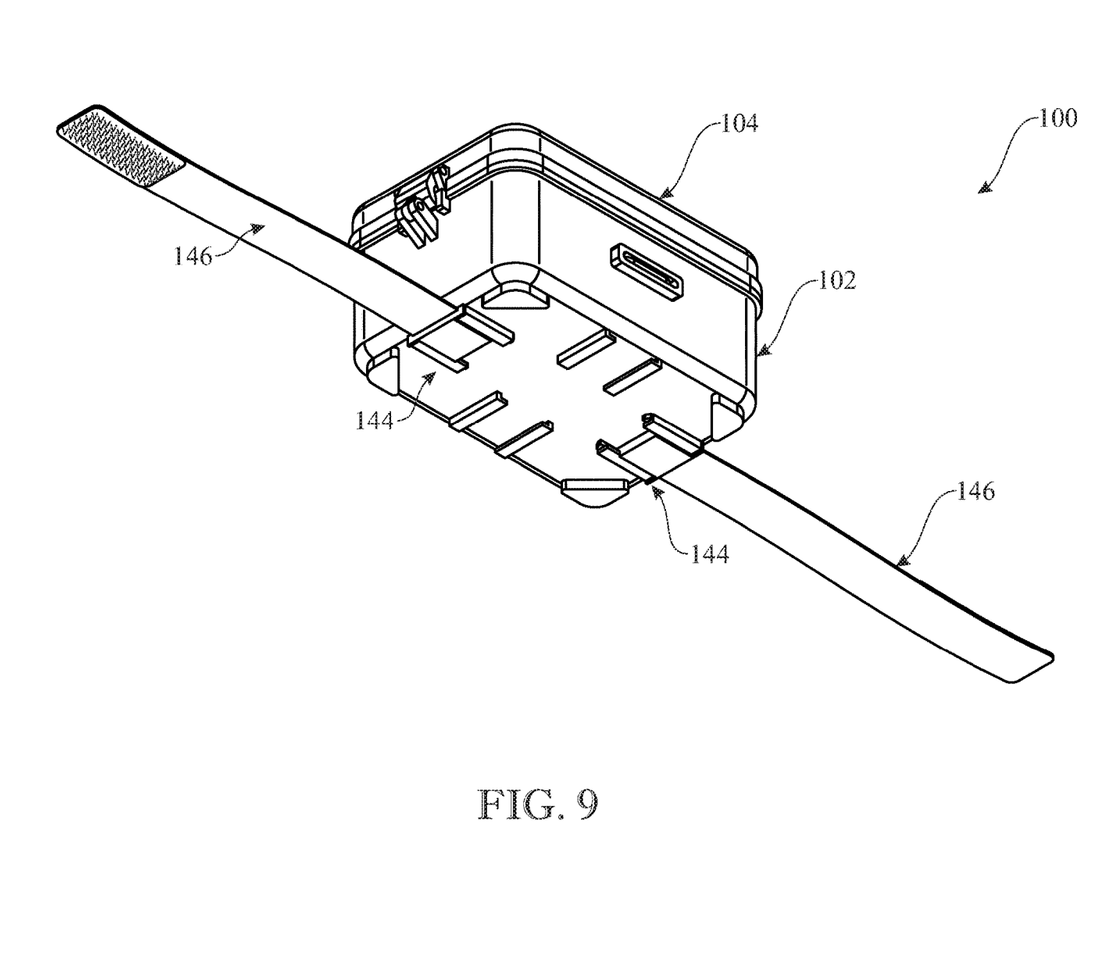
FIG. 9 presents another isometric view similar to that of FIG. 8, now illustrating the pair of straps attached to the opposite ends of the bottom of the container body.

The container body 102 defines a main, or major, portion 126A of the storage compartment 126, while the container lid 104 defines an auxiliary, or minor, portion 126B of the storage compartment 126. The inner portion 108B of the solar-charging module 108 only protrudes into the auxiliary portion 126B of the storage compartment 126, as best seen in FIG. 7. Also, as best seen in FIGS. 4, 5 and 7, a removable false bottom 134 formed by a stiff sheet or plate of a suitable material, such as a plastic, is disposed on a ledge 136 formed about the pairs of opposite side and end walls 110, 112 of the container body 102, rising up from the bottom wall 114 thereof, so as to define a base portion 126C of the storage compartment 126 in the main portion 126A thereof. The base portion 126C of the storage compartment 126 may be used for housing personal items under the removable false bottom 134.

The arrangement of mechanisms 106 that form the water resistant seal between the container body 102 and the container lid 104 basically includes at least one hinge 138, at least one latch 140 and a sealing gasket 142. The hinge 138 interconnects the container body 102 and the container lid 104 proximate respective adjacent first portions of the top rim 116 of the container body 104 and the bottom rim 124 of the container lid 104 at the respective ones of the opposite pairs of end walls 112, 120 thereof. The hinge 138 permits the container lid 104 to pivot relative to the container body 102 so as to open and close the storage compartment 126, as respectively shown in FIGS. 4 and 3. The latch 140 is positioned proximate respective adjacent second portions of the top rim 116 of the container body 102 and the bottom rim 124 of the container lid 104 at the respective others of the opposite pairs of end walls 112, 120 thereof. The latch 140 is adapted for detachably securing the container lid 104 to the container body 102. The latch 140 being on the respective second portions of the top and bottom rims 116, 124 on the others of the opposite pairs of end walls 112, 120 are opposite from the hinge 138 being on the respective first portions of the top and bottom rims 116, 124 on the ones of the opposite pairs of end walls 112, 120. The sealing gasket 142, as seen in FIG. 7, is applied about at least one of the top rim 116 of the container body 102 and the bottom rim 124 of the container lid 104 so as to form the water resistant seal therebetween when fitted together.

Figure 10:
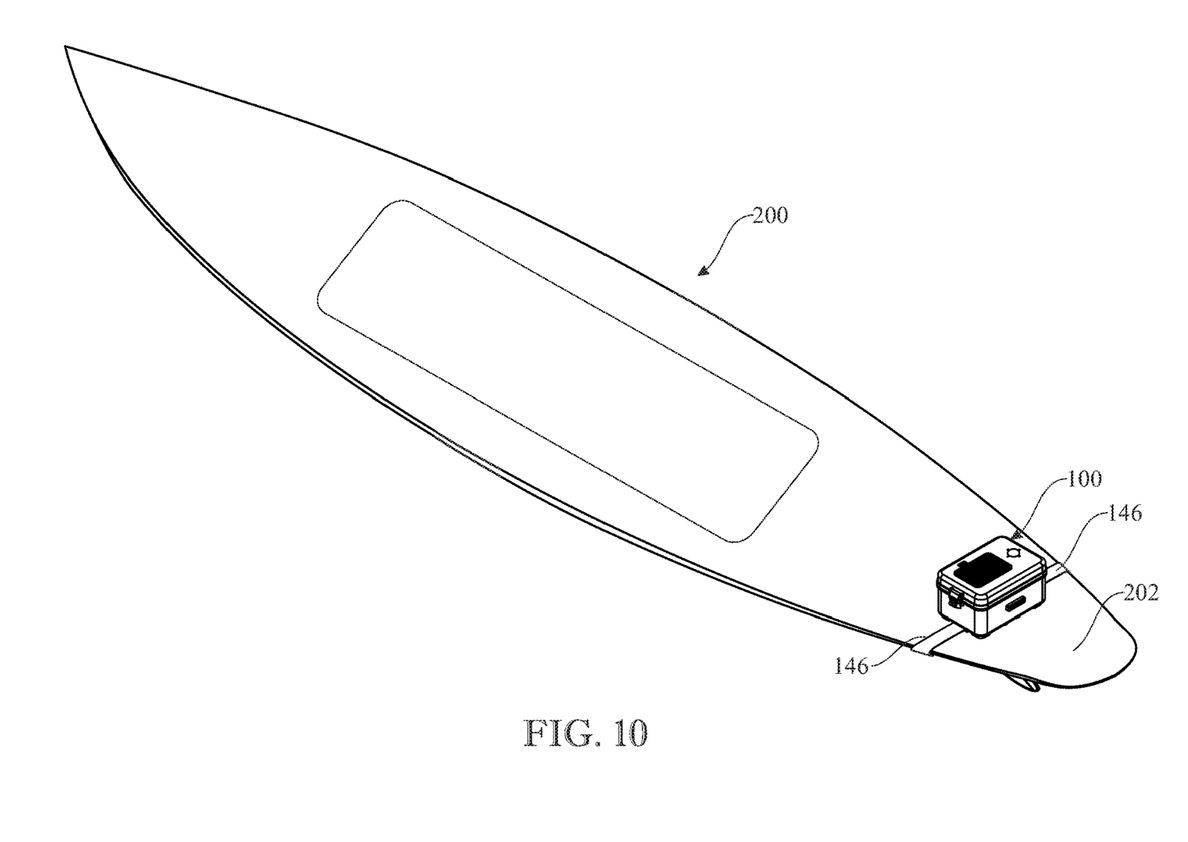
FIG. 10 presents a top isometric view of a surfboard with the apparatus secured about a rear end portion thereof by use of the pair of straps.
Figure 11:
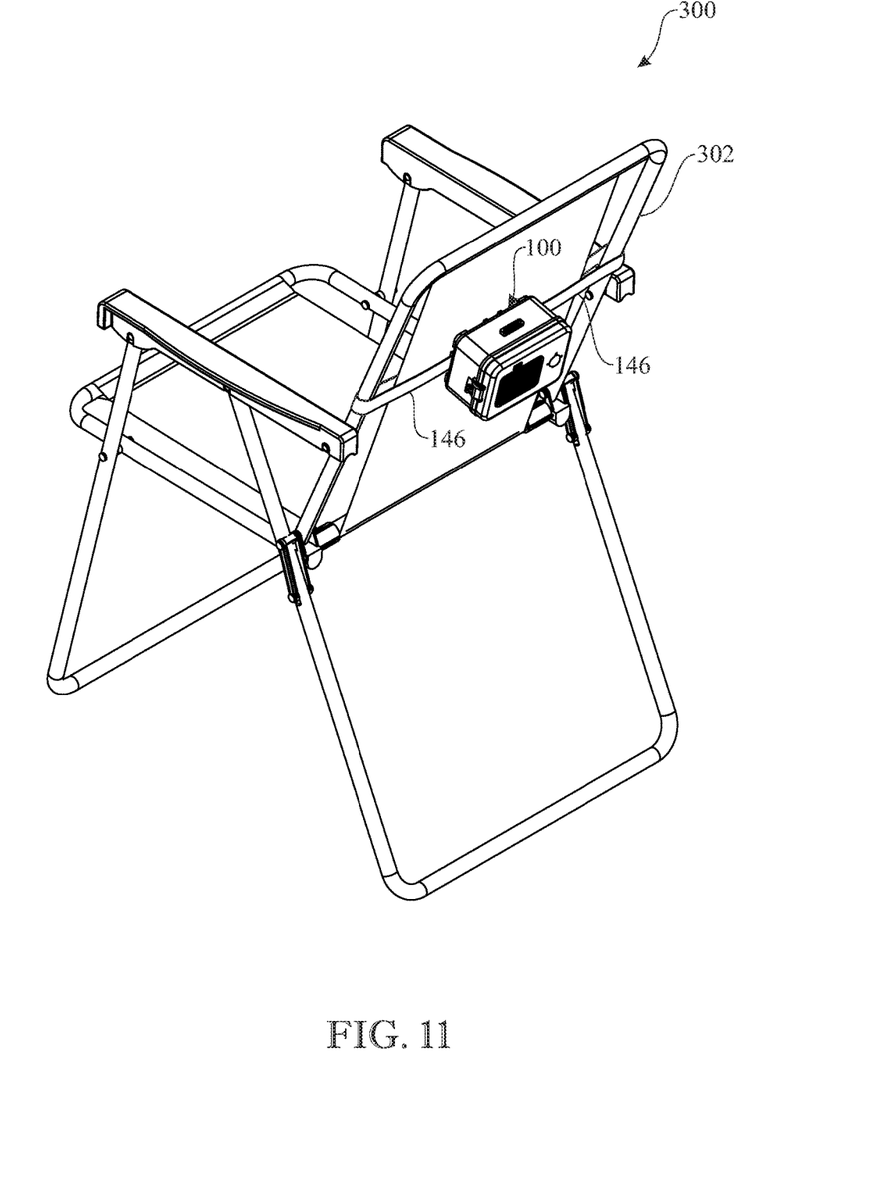
FIG. 11 presents a top rear isometric view of a beach chair with the apparatus secured about a back portion of the chair by use of the pair of straps.

Referring now to FIGS. 8-11, the apparatus 100 may include at least one and preferably two pairs of anchors 144, and at least a pair of straps 146. Each anchor 144 is in the form of a pair of rails 148 attached to and protruding outwardly from the exterior of the bottom wall 114 of the container body 102. Each anchor 144 is located intermediately between feet 149 attached at and protruding outwardly from the four corners of the bottom wall 114. Each of the straps 146 has a pair of opposite ends. At an inner one of the opposite ends of each strap 146 is attached a U-shaped hook 150 that is detachably attachable with the pair of rails 148 of one of the anchors 144. At an outer one of the opposite ends of each strap 146 is mounted one of a pair of hook and loop patches 152, 154 being detachably attachable to one another for enabling the straps 146 to be securely fitted about a portion of an external structure for mounting the apparatus 100 thereto. Examples of an external structure are a surfboard 200 wherein the apparatus 100 is secured on a rear end portion 202 thereof, as seen in FIG. 10, and a beach chair 300 wherein the apparatus 100 is secured on a back portion 302 thereof, as seen in FIG. 11. Also, as seen in FIGS. 1-6, the apparatus 100 includes at least one and preferably a pair of shackles 156 being mounted to the opposite pair of side walls 110 of the container body 102 and protruding either or both interiorly and exteriorly thereof. By use of bungee cords, suitable cordage or the like, an electronic device stored within the storage compartment 126 upon the false bottom 134 may be secured to the shackles 156 or the apparatus 100 may be secured to an exterior structure, such as the ones seen in FIGS. 10 and 11.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A solar-charging storage container apparatus, comprising:

a container body having a top rim;

a container lid having a bottom rim, said container lid at said bottom rim thereof being adapted to overlie said container body at said top rim thereof such that said container body and said container lid form a storage compartment, said container lid having an opening extending completely through a central area thereof, the opening having a shape defined by an opening perimeter;

an arrangement of mechanisms positioned proximate said top rim of said container body and said bottom rim of said container lid and being adapted to removably fit said top and bottom rims together so as to form a water resistant seal therebetween;

a solar-charging module integrated directly into said container lid, the solar charging module including a main body having a perimeter conforming to the shape of the lid opening but sized nominally smaller than the lid opening, an uppermost portion of the solar charging module extending outward beyond the main body perimeter to define a shoulder, the shoulder extending outwardly such that it overlaps an upper surface portion of the container lid just exteriorly of the container lid opening perimeter, a u-shaped sealing gasket interposed between the solar charging module main body perimeter, the solar charging module shoulder, and the container lid opening perimeter, such that the solar charging module main body extends through the lid opening and into the storage compartment, the uppermost portion of the solar charging module disposed exteriorly of the storage compartment and having a solar array on an outer portion of said module being exposed exteriorly of said container lid to receive solar rays and at least one electrical connector on an inner portion of said module being exposed interiorly of said container lid to form an electrical connection to an electronic device stored in said storage compartment.

2. The apparatus as recited in claim 1 wherein said container body defines a main portion of said storage compartment, and said container lid defines an auxiliary portion of said storage compartment such that said inner portion of said solar-charging module protrudes into said auxiliary portion of said storage compartment.

3. The apparatus as recited in claim 1 further comprising a removable false bottom disposed in said main portion of said storage compartment so as to provide a base portion of said storage compartment for housing items under said removable false bottom.

4. The apparatus as recited in claim 1 wherein said arrangement of mechanisms comprises at least one hinge interconnecting said container lid and said container body proximate respective adjacent first portions of said bottom rim of said container lid and said top rim of said container body so as to permit said container lid to pivot relative to said container body and thereby open and close said storage compartment.

5. The apparatus as recited in claim 1 wherein said arrangement of mechanisms comprises at least one latch located proximate respective adjacent second portions of said bottom rim of said container lid and said top rim of said container body and being adapted for detachably securing said container lid to said container body.

6. The apparatus as recited in claim 1 wherein said arrangement of mechanisms comprises a sealing gasket applied about at least one of said top rim of said container body and said bottom rim of said container lid so as to form said water resistant seal therebetween when fitted together.

7. The apparatus as recited in claim 1 further comprising at least one shackle mounted to said container body and protruding interiorly thereof, said shackle being adapted to secure thereto an electronic device stored in said storage compartment.

8. The apparatus as recited in claim 1 further comprising at least one shackle mounted to said container body and protruding exteriorly thereof, said shackle being adapted to enable securing said apparatus to an exterior structure.

9. The apparatus as recited in claim 1 further comprising: at least a pair of anchors attached to a bottom of said container body; and at least a pair of straps each having a pair of opposite ends, each strap at one of said opposite ends being detachably attachable to one of said anchors and at the other of said opposite ends being detachably attachable to one another for enabling said straps to securely fit about a portion of an external structure for mounting said apparatus thereto.

10. A solar-charging storage container apparatus, comprising:
a container body having a top rim;
a container lid having a bottom rim, said container lid at said bottom rim thereof being adapted to overlie said container body at said top rim thereof such that said container body and said container lid form a storage compartment;
an arrangement of mechanisms positioned proximate said top rim of said container body and said bottom rim of said container lid and being adapted to removably fit said top and bottom rims together so as to form a water resistant seal therebetween, said arrangement of mechanisms comprising
at least one hinge interconnecting said container lid and said container body proximate respective adjacent first portions of said bottom rim of said container lid and said top rim of said container body so as to permit said container lid to pivot relative to said container body and thereby open and close said storage compartment,
at least one latch positioned proximate respective adjacent second portions of said bottom rim of said container lid and said top rim of said container body and being adapted for detachably securing said container lid to said container body, and
a sealing gasket applied about at least one of said top rim of said container body and said bottom rim of said container lid so as to form said water resistant seal therebetween when fitted together; and
a solar-charging module in sealing engagement with an interior lid opening extending completely through the lid and defined by an interior lid perimeter the solar-charging module having a solar array on an outer portion of said module extending exteriorly of said container lid and thereby exposed to receive solar rays, and the solar-charging module having a lower portion extending interiorly of said container lid into said storage compartment, at least one electrical connector on an inner portion of said module being exposed interiorly of said container lid to define an electrical connection configured to enable electrical communication with an electronic device contained within said storage compartment.

11. The apparatus as recited in claim 10 wherein said respective second portions of said bottom rim of said container lid and said top rim of said container body are located opposite said respective first portions thereof.

12. The apparatus as recited in claim 10 wherein said container body defines a main portion of said storage compartment, and said container lid defines an auxiliary portion of said storage compartment such that said inner portion of said solar-charging module protrudes into said auxiliary portion of said storage compartment.

13. The apparatus as recited in claim 10 further comprising a removable false bottom disposed in said main portion of said storage compartment so as to provide a base portion of said storage compartment for housing items under said removable false bottom.

14. The apparatus as recited in claim 10 further comprising at least one shackle mounted to said container body and protruding interiorly thereof, said shackle being adapted to secure thereto an electronic device stored in said storage compartment.

15. The apparatus as recited in claim 10 further comprising at least one shackle mounted to said container body and protruding exteriorly thereof, said shackle being adapted to enable securing said apparatus to an exterior structure.

* * * * *